(12) United States Patent
Wei

(10) Patent No.: US 9,977,273 B2
(45) Date of Patent: May 22, 2018

(54) DISPLAY PANEL AND DISPLAY DEVICE

(71) Applicants: XIAMEN TIANMA MICRO-ELECTRONICS CO., LTD., Xiamen (CN); TIANMA MICRO-ELECTRONICS CO., LTD, Shenzhen (CN)

(72) Inventor: Sifan Wei, Shanghai (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 15 days.

(21) Appl. No.: 14/850,552

(22) Filed: Sep. 10, 2015

(65) Prior Publication Data
US 2017/0003534 A1 Jan. 5, 2017

(30) Foreign Application Priority Data

Jun. 30, 2015 (CN) .......................... 2015 1 0374974

(51) Int. Cl.
*G02F 1/1333* (2006.01)
*G02F 1/1337* (2006.01)

(52) U.S. Cl.
CPC ........ *G02F 1/13338* (2013.01); *G02F 1/1337* (2013.01)

(58) Field of Classification Search
CPC ........................... G02F 1/13338; G02F 1/1337
See application file for complete search history.

(56) References Cited

U.S. PATENT DOCUMENTS

| 7,630,041 B2 | 12/2009 | Liu et al. |
| 8,384,863 B2 | 2/2013 | Fu et al. |
| 8,587,733 B2 | 11/2013 | Liu et al. |

(Continued)

FOREIGN PATENT DOCUMENTS

| CN | 101498864 A | 8/2009 | |
| CN | 101901069 | * 12/2010 | ............. G06F 3/041 |

(Continued)

OTHER PUBLICATIONS

Chinese Application No. 201510374974.0, First Office Action dated May 25, 2017.
(Continued)

*Primary Examiner* — Sang V Nguyen
(74) *Attorney, Agent, or Firm* — Alston & Bird LLP

(57) ABSTRACT

A display panel includes a first substrate and a second substrate arranged opposite from one another; a liquid crystal layer arranged between the first substrate and the second substrate; a first film layer arranged between the first substrate and the liquid crystal layer, and a second film layer arranged between the second substrate and the liquid crystal layer, where the first film layer includes a first optical alignment base material and a first carbon nanotube layer, where the first carbon nanotube layer includes a plurality of carbon nanotubes extending along a first direction and is adhered to a side of the first substrate closer to the liquid crystal layer through the first optical alignment base material; and a plurality of first touch electrodes electrically connected to the first carbon nanotube layer.

13 Claims, 4 Drawing Sheets

(56) References Cited

U.S. PATENT DOCUMENTS

| | | | |
|---|---|---|---|
| 2004/0047038 A1* | 3/2004 | Jiang | B82Y 20/00 359/485.01 |
| 2007/0115413 A1* | 5/2007 | Liu | B82Y 20/00 349/123 |
| 2007/0296897 A1* | 12/2007 | Liu | B82Y 20/00 349/123 |
| 2008/0013002 A1* | 1/2008 | Hong | G02B 3/12 349/15 |
| 2008/0192014 A1* | 8/2008 | Kent | B82Y 10/00 345/173 |
| 2009/0073363 A1* | 3/2009 | Fu | B82Y 20/00 349/128 |
| 2009/0153509 A1* | 6/2009 | Jiang | G06F 3/0416 345/173 |
| 2009/0160796 A1 | 6/2009 | Jiang et al. | |
| 2009/0225265 A1* | 9/2009 | Fu | G02F 1/1337 349/128 |
| 2009/0268139 A1* | 10/2009 | Liu | G02F 1/1337 349/123 |
| 2011/0102338 A1* | 5/2011 | Liu | G06F 3/041 345/173 |
| 2011/0242046 A1* | 10/2011 | Feng | G06F 3/044 345/174 |
| 2012/0075582 A1* | 3/2012 | Feng | B82Y 20/00 351/49 |
| 2012/0236392 A1* | 9/2012 | Shih | G02F 1/167 359/296 |
| 2014/0126053 A1* | 5/2014 | Won | G02F 1/133533 359/487.02 |
| 2015/0380689 A1* | 12/2015 | Choi | G02B 5/3033 257/40 |

FOREIGN PATENT DOCUMENTS

| | | |
|---|---|---|
| CN | 101901069 A | 12/2010 |
| KR | 20100121805 A | 11/2010 |

OTHER PUBLICATIONS

Office Action as received in corresponding German Application No. 102015220848.6, dated Mar. 22, 2016.

* cited by examiner

DISPLAY PANEL AND DISPLAY DEVICE

CROSS REFERENCE TO RELATED APPLICATIONS

The present application claims the priority of Chinese Patent Application No. 201510374974.0, titled "DISPLAY PANEL AND DISPLAY DEVICE", filed on Jun. 30, 2015 with the State Intellectual Property Office of People's Republic of China, which is incorporated herein by reference in its entirety.

FIELD OF THE INVENTION

The present disclosure relates to the technical field of display, and in particular relates to a display panel and a display device.

BACKGROUND OF THE INVENTION

In recent years, with the rapid development and application of information science and technology, people increasingly rely on electronic products such as smart phone and tablet computer. Furthermore the conventional way of controlling electronic products by using a button is gradually replaced by a way of controlling electronic products by using a touch operation. However, a conventional touch display device has a complicated structure, and is thick and heavy, which does not meet the current trend of light and thin electronic products.

BRIEF SUMMARY OF THE INVENTION

In view of above, a display panel and a display device are provided according to the disclosure, where a first film layer of the display panel is integrated with polarization function, alignment function and touch function, which simplifies the structure of the display panel and reduces the thickness and weight of the display panel In order to fulfill the purpose above, technical solutions are provided according to the present disclosure as follows.

A display panel is provided, which includes: a first substrate and a second substrate arranged oppositely;

a liquid crystal layer arranged between the first substrate and the second substrate;

a first film layer arranged between the first substrate and the liquid crystal layer, and a second film layer arranged between the second substrate and the liquid crystal layer, where the first film layer includes a first optical alignment base material and a first carbon nanotube layer, where the first carbon nanotube layer is adhered to a side of the first substrate closer to the liquid crystal layer through the first optical alignment base material, and includes multiple carbon nanotubes extending along a first direction, and the orientation of the first optical alignment base material is parallel to the first direction;

and multiple first touch electrodes electrically connected to the first carbon nanotube layer, where the multiple touch electrodes are arranged in a spaced manner on a first side of the first carbon nanotube layer in a direction perpendicular to the first direction.

Accordingly, a display device including the display panel above is further provided according to the present disclosure.

The technical solutions of the present disclosure have at least following advantages, compared with the conventional technology:

A display panel and a display device are provided according to embodiments of the present disclosure. The display panel includes a first substrate and a second substrate arranged oppositely; a liquid crystal layer arranged between the first substrate and the second substrate; a first film layer arranged between the first substrate and the liquid crystal layer, and a second film layer arranged between the second substrate and the liquid crystal layer, where the first film layer includes a first optical alignment base material and a first carbon nanotube layer, where the first carbon nanotube layer is adhered to a side of the first substrate closer to the liquid crystal layer through the first optical alignment base material, and includes multiple carbon nanotubes extending along a first direction, and the orientation of the first optical alignment base material is parallel to the first direction; and multiple first touch electrodes electrically connected to the first carbon nanotube layer, where the multiple touch electrodes are arranged in a spaced manner on a first side of the first carbon nanotube layer in a direction perpendicular to the first direction.

According to the descriptions above, the technical solutions of the present disclosure has at least following beneficial effects. The multiple carbon nanotubes of the first carbon nanotube layer all extend along the first direction, so that the first carbon nanotube layer has a polarization property. In addition, grooves are formed between adjacent carbon nanotubes in the first carbon nanotube layer, thus the grooves can be used for the initial alignment of the liquid molecules, that is, the first film layer has both alignment capability and polarization capability. The carbon nanotube layer is adhered to the substrate through the optical alignment base material, and the orientation of the first optical alignment base material is arranged to be parallel to the first direction, so that extra adhesives are not necessary, and the alignment capability of the first carbon nanotube layer can be further improved. In addition, due to the conductivity anisotropy of the carbon nanotube, the first carbon nanotube layer is arranged to be electrically connected to the first touch electrodes, so that the first carbon tube layer has a touch function. Thus, the first film layer of the display panel according to the embodiment of present disclosure is integrated with polarization function, alignment function and touch function, which simplifies the structure of the display panel, reduces the thickness and weight of the display panel, and meets the current trend of light and thin electronic products.

BRIEF DESCRIPTION OF THE DRAWINGS

To describe the technical solutions in the embodiments of the present disclosure or in the conventional technology more clearly, the following briefly describes the drawings involved in the embodiments of the present disclosure. Apparently, the drawings described below are some embodiments, and persons of ordinary skill in the art can derive other drawings according to the drawings without any creative effort.

DETAILED DESCRIPTION OF THE INVENTION

The technical solutions of embodiments of the present disclosure are described clearly and completely hereinafter in conjunction with the drawings. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

As described in background section, the conventional touch display device has a complicated structure, and is thick and heavy, which does not meet the current trend of light and thin electronic products.

In view of that, a display panel is provided according to embodiments of the present disclosure. A first film layer of the display panel is integrated with polarization function, alignment function and touch function, which simplifies the structure and reduces the thickness and weight of the display panel. The display panel according to embodiments of the present disclosure is further described in conjunction with FIGS. 1 to 7.

Figure 1:
FIG. 1 is a structural schematic diagram of a display panel according to an embodiment of the present disclosure.
Figure 2:
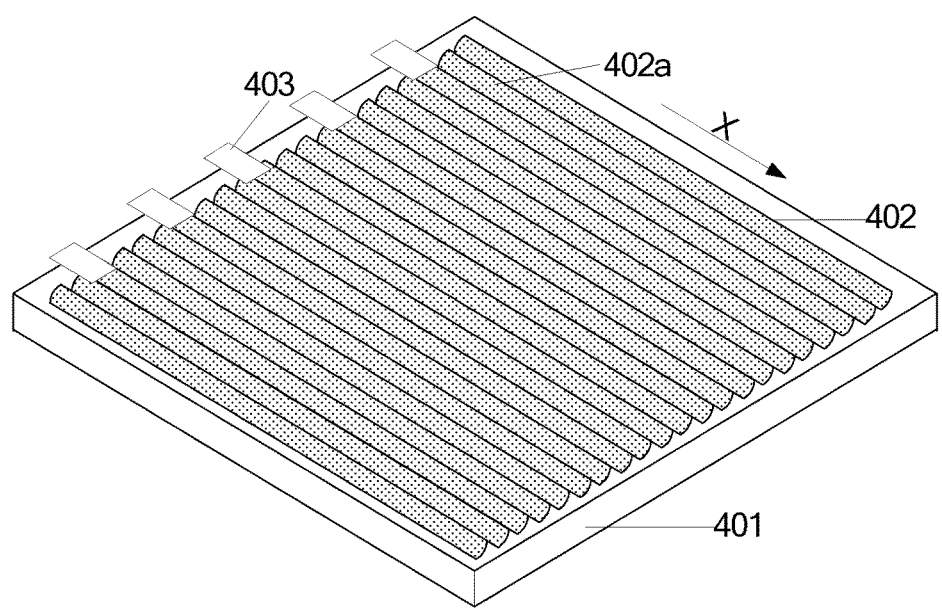
FIG. 2 is a structural schematic diagram of a first film layer according to an embodiment of the present disclosure.

FIG. 1 is a structural schematic diagram of a display panel according to an embodiment of the present disclosure, and FIG. 2 is a structural schematic diagram of a first film layer according to an embodiment of the present disclosure.

The display panel includes:

a first substrate 100 and a second substrate 200 arranged oppositely;

a liquid crystal layer 300 arranged between the first substrate 100 and the second substrate 200;

a first film layer 400 arranged between the first substrate 100 and the liquid crystal layer 300, and a second film layer 500 arranged between the second substrate 200 and the liquid crystal layer 300, where the first film layer 400 includes a first optical alignment base material 401 and a first carbon nanotube layer 402, where the first carbon nanotube layer 402 is adhered to a side of the first substrate 100 closer to the liquid crystal layer 300, and includes multiple carbon nanotubes 402a extending along a first direction X, and the orientation of the first optical alignment base material is parallel to the first direction X;

and multiple first touch electrodes electrically connected to the first carbon nanotube layer 402, where the multiple touch electrodes are arranged in a spaced manner on a first side of the first carbon nanotube layer 402 along a direction perpendicular to the first direction X.

The first substrate and the second substrate according to embodiment of the present disclosure mainly play a supportive role, and may be made of glass, quartz, diamond or plastic. In addition, the first substrate and the second substrate may be array substrates, color film substrates or other structures of a liquid crystal display device, which is not limited herein and needs to be designed according to practical applications.

According to the above descriptions, the multiple carbon nanotubes of the first carbon nanotube layer all extend along the first direction, so that the first carbon nanotube layer has optical polarization property, that is, the first carbon nanotube layer is transmissive to light with a polarization direction perpendicular to the first direction, and is absorptive to light with a polarization direction parallel to the first direction; grooves are formed between adjacent carbon nanotubes of the first carbon nanotube layer, where the grooves can be used for initial alignment of liquid molecules; the orientation of the first optical alignment base material with good optical alignment character is arranged as the extending direction of the carbon nanotubes of the first carbon nanotube layer, that is, the orientation of the microstructure of the optical alignment base material is the same as that of the microstructure of the first carbon nanotube layer, which can exert a synergistic effect between the optical alignment base material and the first carbon nanotube layer, and thereby significantly improving the alignment capability of the first carbon nanotube layer; and since the carbon nanotubes have conductivity anisotropy, the first touch electrodes are arranged to be electrically connected to the first carbon nanotube layer, so that the first carbon nanotube layer has a touch function, which simplifies the structure of the display panel, reduces the thickness and weight of the display panel, and meets the current trend of light and thin electronic products.

FIG. 2 shows a touch structure according to an embodiment of the present disclosure. The touch structure includes the first carbon nanotube layer 402 and the first touch electrodes 403, and may be a self-capacitance touch structure or a mutual-capacitance touch structure.

Figure 3:
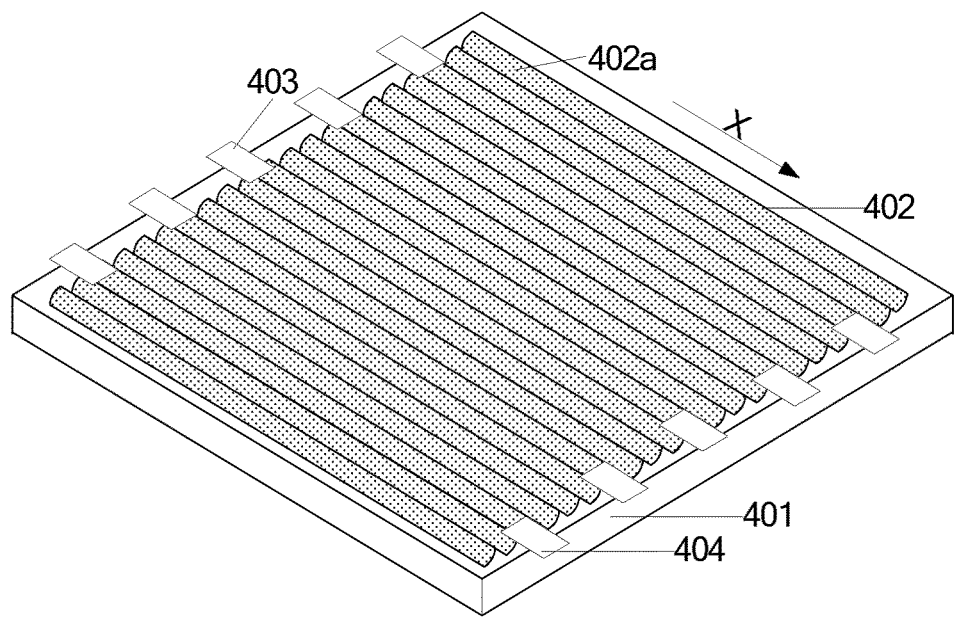
FIG. 3 is a structural schematic diagram of a first film layer according to another embodiment of the present disclosure.

FIG. 3 shows a structural schematic diagram of a first film layer according to another embodiment of the present disclosure. The first film layer further includes multiple second touch electrodes 404 electrically connected to the first carbon nanotube layer 402, where the multiple touch electrodes are arranged in a spaced manner on a second side of the first carbon nanotube layer 402 along a direction perpendicular to the first direction X, and the first touch electrodes 403 and the second electrodes 404 are arranged correspondingly.

The first electrodes, the second electrodes and the first carbon nanotube layer form a first functional layer of a mutual-capacitance touch structure, and the first functional layer is an emission layer or a reception layer. After the first functional layer is formed, a second functional layer different from the first functional layer is formed on the display panel to form a mutual-capacitance touch structure.

Figure 4:
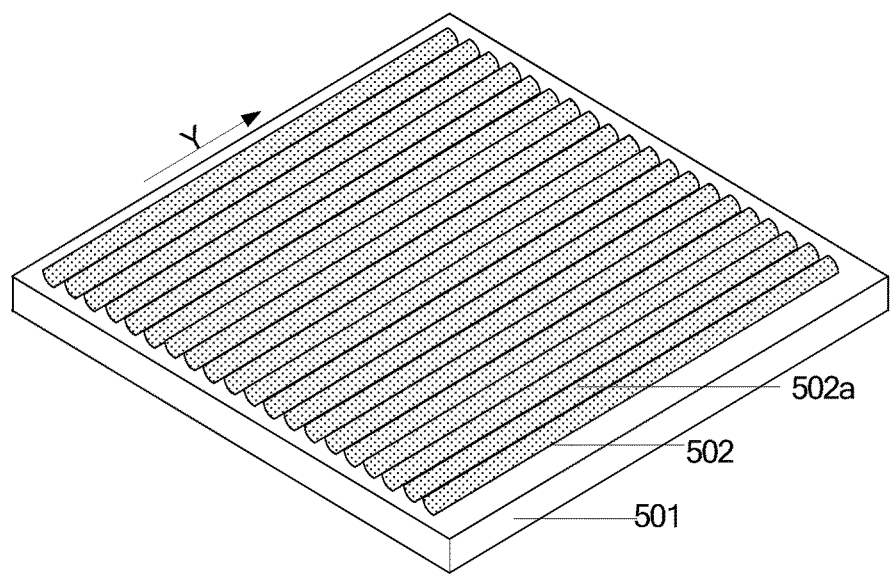
FIG. 4 is a structural schematic diagram of a second film layer according to an embodiment of the present disclosure.

In the display panel according to embodiment of the present disclosure, the first film layer achieves the initial alignment of the liquid molecules through the carbon nanotube layer, and the second film layer may be a conventional alignment layer, to achieve the alignment of the liquid molecules. In addition, in order to further simplify the structure and reduce the thickness and weight of the display panel, the second film layer according to embodiment of the present disclosure may be integrated with polarization function and alignment function. FIG. 4 is a structural schematic diagram of a second film layer according to an embodiment of the disclosure. The second film layer includes a second optical alignment base material 501 and a second carbon nanotube layer 502.

The second carbon nanotube layer 502 includes multiple carbon nanotubes extending along a second direction Y and is adhered to a side of the second substrate 200 closer to the liquid crystal layer 300 through the second optical alignment base material 501, and the orientation of the second optical alignment base material 501 is parallel to the second direction Y.

According to the descriptions above, the multiple carbon nanotubes of the second carbon nanotube layer all extend along the second direction, so that the second carbon nanotube layer has optical polarization property, that is, the second carbon nanotube layer is transmissive to light with a polarization direction perpendicular to the second direction, and is absorptive to light with a polarization direction parallel to the second direction; and grooves are formed between adjacent carbon nanotubes of the second carbon nanotube layer, where the grooves can be used for the initial alignment of the liquid molecules.

Figure 5:
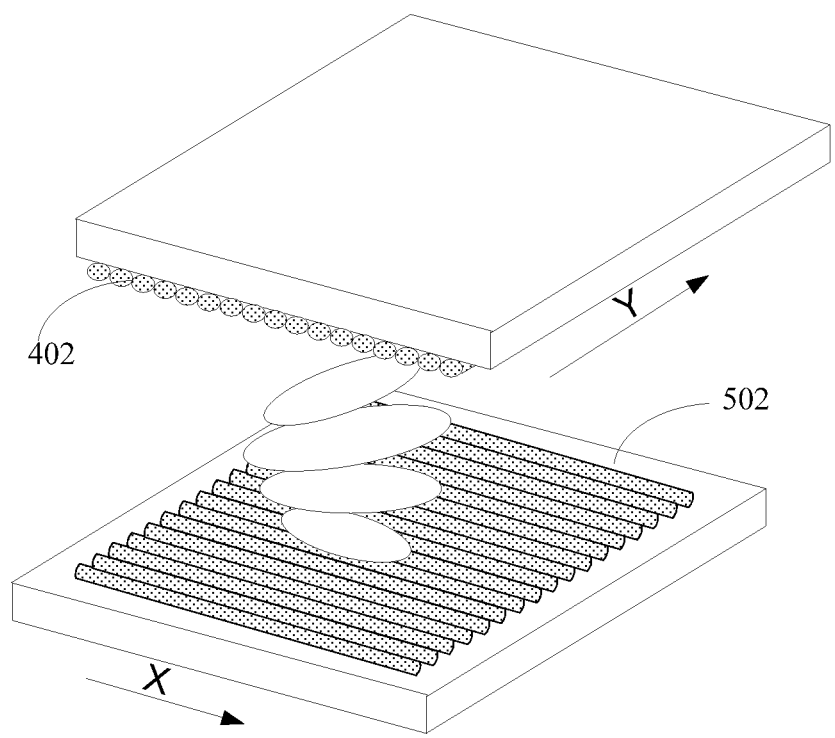
FIG. 5 is a schematic diagram showing alignment of liquid molecules according to an embodiment of the present disclosure.

FIG. 5 is a schematic diagram that shows alignment of liquid molecules according to an embodiment of the present disclosure. In FIG. 5, the first direction X intersects with the second direction Y, and the first carbon nanotube layer 402 and the second carbon nanotube layer 502 are used for the initial alignment of the liquid molecules.

The first carbon nanotube layer and the second carbon nanotube layer each include at least one carbon nanotube layer film, where the carbon nanotube layer film may be a self-supporting film structure directly drawn from a carbon nanotube array. The first carbon nanotube layer and the second carbon nanotube layer each may be a large-area carbon nanotube layer formed by laying multiple carbon nanotube layer films flat, or each may be a thick carbon nanotube layer formed by stacking multiple carbon nanotube layer films. Either way for arranging the carbon nanotube layer films can be used, as long as the carbon nanotubes of the carbon nanotube layer extend along a same direction. In addition, each carbon nanotube in the first carbon nanotube layer is connected to an adjacent carbon nanotube in the first direction end to end by Van der Wals force, and each carbon nanotube in the second carbon nanotube layer is connected to an adjacent carbon nanotube in the second direction end to end by Van der Wals force.

The carbon nanotubes may include one or more types of single-walled carbon nanotubes, double-walled carbon nanotubes and multi-walled carbon nanotubes, which is not limited in the embodiment of the present disclosure. The diameter of the carbon nanotube ranges from 0.5 nm to 50 nm, inclusive, and the length of the carbon nanotube ranges from 50 nm to 5 mm, inclusive. Preferably, the length of the carbon nanotube according to embodiment of the present disclosure ranges from 100 μm to 900 μm, inclusive.

Figure 6:
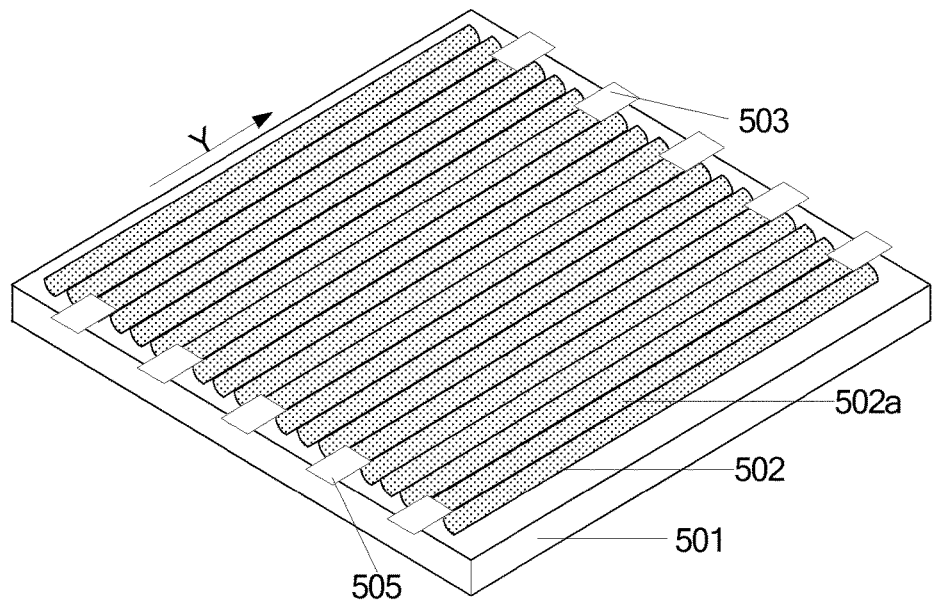
FIG. 6 is a structural schematic diagram of a second film layer according to another embodiment of the present disclosure.

Furthermore, the second carbon nanotube layer of the second film layer can be used for fabricating the second functional layer in a case that the touch structure in the display panel is a mutual capacitance touch structure. FIG. 6 is a structural schematic diagram of a second film layer according to another embodiment of the present disclosure. The second film layer further includes multiple third touch electrodes 503 and multiple fourth touch electrodes 504 electrically connected to the second carbon nanotube layer 502, where the multiple third touch electrodes 503 are arranged in a spaced manner and the multiple fourth touch electrodes 504 are arranged in a spaced manner, in a direction perpendicular to the second direction Y, the third touch electrodes 503 are arranged on a first side of the second carbon nanotube layer 502, the fourth touch electrodes 504 are arranged on a second side of the second carbon nanotube layer 502, and the third touch electrodes 503 and the fourth touch electrodes 504 are arranged correspondingly.

The first touch electrodes, the second touch electrodes and the first carbon nanotube layer form the first functional film layer of the mutual touch structure, and the third touch electrodes, the fourth touch electrodes and the second carbon nanotube layer form the second functional film layer. The first functional film layer and the second functional film layer are different functional layers, that is, the second functional film layer is a reception layer in a case that the first functional layer is an emission layer, and the second functional film layer is an emission layer in a case that the first functional film layer is a reception layer.

It should be noted that the touch electrodes according to the embodiment of the present disclosure may be arranged on the surface of the carbon nanotube layer, or arranged inside the carbon nanotube layer, to form electric connection with the carbon nanotube layer, which is not limited in the present disclosure.

In order to further improve the alignment capability of the first film layer and that of the second film layer, the first optical alignment base material and the second optical alignment base material can penetrate into gaps between adjacent carbon nanotubes of the respective carbon nanotube layers, and cover the surfaces of the respective carbon nanotube layers closer to the liquid crystal layer. The surface of the first optical alignment base material closer to the liquid crystal layer has multiple first grooves, which extend along the first direction, and the surface of the second optical alignment base material closer to the liquid crystal layer has multiple second grooves, which extend along the second direction, where the first grooves and the second grooves are beneficial to initial alignment of the liquid molecules.

Figure 7:
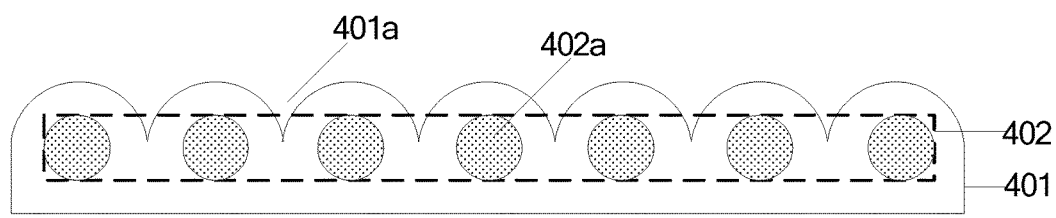
FIG. 7 is a structural schematic diagram of a first optical alignment base material according to an embodiment of the present disclosure.

Specifically, the first optical alignment base material is taken as an example for illustration. FIG. 7 shows a structural schematic diagram of a first optical alignment base material according to an embodiment of the disclosure. There are gaps between the adjacent carbon nanotubes 402a of the first carbon nanotube layer 402, and the first optical alignment base material penetrates into the gaps between the adjacent carbon nanotubes 402a of the first carbon nanotube layer 402, so that the first optical base material 401 can better fix the first carbon nanotubes 402a. Furthermore, there are multiple first grooves 401 on the surface of the first optical alignment base material closer to the liquid crystal layer, and the first grooves 401 extend along the first direction.

The optical alignment base material can not only adhere the carbon nanotube layer to the surface of the substrate without extra adhesives, but also can, combined with the carbon nanotube layer, improve the polarization capability of the film layer. The optical alignment base material has a good optical alignment property, and can have a specific orientation under radiation of polarized ultraviolet light. The orientation of the optical base material according to the embodiment of the present disclosure is parallel to the extending direction of the carbon nanotubes, that is, the angle between the orientation of the optical alignment base material and the extending direction of the carbon nanotubes is zero degree, thereby improving the polarization capability of the film layer. The first optical alignment base material and the second alignment base material each may be one or more of cellulose triacetate, polyimide and polyamide acid. In the embodiment of the present disclosure, the first optical alignment base material and the second optical alignment base material are polyimide preferably.

In addition, a method for adhering a carbon nanotube layer to a substrate through optical alignment base material is further provided according to the present disclosure. The method includes steps S1 to S4.

Step S1 includes providing a substrate.

Step S2 includes coating the surface of the substrate with an optical alignment base material.

The optical alignment base material is liquid initially, and can adhere and fix the carbon nanotube layer through being aligned and solidified by light radiation. The surface of the substrate may be evenly coated with solution of the optical alignment base material by whirl coating or spin coating. The thickness of the coating may be determined as needed, and preferably may range from 100 nm to 100 µm, inclusive.

Step S3 includes laying carbon nanotubes on a surface of the optical alignment base material away from the substrate.

The carbon nanotube layer may partly or completely submerge in the coating. In addition step S3 may include a step of pre-baking the liquid optical alignment base material to remove redundant solvent in the coating structure which facilitates later optical alignment and solidification. For the pre-baking process, the temperature may range from 90 degree Celsius to 130 degree Celsius, inclusive, and the length of time may range from 60 seconds to 120 seconds, inclusive. In this embodiment of the present disclosure, the temperature for the baking processing is about 130 degrees Celsius, and the length of time for the baking processing is about 120 s.

S4 includes solidifying the optical alignment base material and adhering the carbon nanotube layer to the surface of the substrate.

The optical alignment base material is radiated by ultraviolet light, so that after being solidified, the optical alignment base material has a predetermined optical alignment direction. The energy of the polarized ultraviolet light may range from 300 mj to 1000 mj, inclusive, and optionally may range from 500 mj to 800 mj, inclusive, in this embodiment. Preferably, polyimide film is used as the optical alignment base material. The polyimide film has the best light alignment capability under radiation of light with energy ranging from 500 mj to 800 mj. By adjusting the polarization direction of the polarized ultraviolet light, the angle between the polarization direction of the polarized ultraviolet light and the extending direction of the carbon nanotube in the carbon nanotube layer may be zero degree, that is, the polarization direction of the polarizing ultraviolet light is parallel to the extending direction of the carbon nanotubes in the carbon nanotube layer.

The optical alignment base material may be heated to accelerate the solidification at a temperature ranging from 210 degree Celsius to 230 degree Celsius (inclusive) after the optical alignment by radiation of polarized ultraviolet light, where the length of time for heating process may range from 20 minutes to 50 minutes, inclusive. In this embodiment of the present disclosure, the temperature for the solidification is about 230 degree Celsius, and the length of time is about 30 minutes.

Furthermore, in order to further improve the polarization capabilities of the first film layer and the second film layer, at least one of the first optical alignment base material and the second optical alignment base material is doped with a dichroic dye, where the polarization direction of the dichroic dye is the same as the orientation of the alignment base material doped with the dichroic dye.

Specially, the optical alignment base material is doped with the dichroic dye, and then is radiated by polarized ultraviolet light to form a specific orientation, so that the orientation of the dichroic dye changes as the orientation of the optical alignment base material changes, thereby improving the polarization capability.

The dichroic ratio of the dichroic dye is not smaller than 7. The dichroic dye may include one or more of an azo dye, an anthraquinone dye, a biphenyl dye, a triphenyl dioxazine and derivatives dye, a monomethine dye, a polymethine dye and a polycyclic dye. In this embodiment of the present disclosure, the dichroic dye is azo dye.

Accordingly, a display device is further provided according to an embodiment of the present disclosure. The display device includes the display panel according to any one of above embodiments.

A display panel and a display device are provided according to embodiments of the present disclosure. The display panel includes a first substrate and a second substrate arranged oppositely; a liquid crystal layer arranged between the first substrate and the second substrate; a first film layer arranged between the first substrate and the liquid crystal layer, and a second film layer arranged between the second substrate and the liquid crystal layer, where the first film layer includes a first optical alignment base material and a first carbon nanotube layer, where the first carbon nanotube layer is adhered to a side of the first substrate closer to the liquid crystal layer through the first optical alignment base material, and includes multiple carbon nanotubes extending along a first direction, and the orientation of the first optical alignment base material is parallel to the first direction; and multiple first touch electrodes electrically connected to the first carbon nanotube layer, where the multiple touch electrodes are arranged in a spaced manner on a first side of the first carbon nanotube layer in a direction perpendicular to the first direction.

According to the above descriptions, in the technical solutions of the embodiments of the present disclosure, the multiple carbon nanotubes of the first carbon nanotube layer all extend along the first direction, so that the first carbon nanotube layer has a polarization property, that is, the first carbon nanotube layer is transmissive to light with the polarization direction perpendicular to the first direction, and is absorptive to light with the polarization direction parallel to the first direction; grooves are formed between adjacent carbon nanotubes in the first carbon nanotube layer, thus the grooves can be used for the initial alignment of the liquid molecules; the orientation of the first optical alignment base material with good optical alignment property is arranged to be parallel to the first direction, thereby significantly improving the alignment capability of the first carbon nanotube layer; and due to the conductivity anisotropy of the carbon nanotube, the first carbon nanotube layer is arranged to be electrically connected to the first touch electrodes, so that the first carbon tube layer has a touch function. Thus, the first film layer of the display panel according to the embodiment of present disclosure is integrated with polarization function, alignment function and touch function, which simplifies the structure of the display panel, reduces the thickness and weight of the display panel, and meets the current trend of light and thin electronic products.

The description of the embodiments disclosed herein enables those skilled in the art to implement or use the present disclosure. Numerous modifications to the embodiments are apparent to those skilled in the art, and the general principle herein can be implemented in other embodiments without deviation from the spirit or scope of the present disclosure. Therefore, the present disclosure is not limited to the embodiments described herein, but in accordance with the widest scope consistent with the principle and novel features.

What is claimed is:

1. A display panel comprising:
   a first substrate;
   a second substrate arranged opposite to the first substrate;
   a liquid crystal layer arranged between the first substrate and the second substrate;
   a first film layer arranged between the first substrate and the liquid crystal layer; and
   a second film layer arranged between the second substrate and the liquid crystal layer;
   wherein the first film layer comprises a first optical alignment base material, and wherein a first carbon nanotube layer is merged into the first optical alignment base material, wherein the first carbon nanotube layer comprises a plurality of first carbon nanotubes extending along a first direction, wherein an orientation of the first optical alignment base material is parallel to the first direction, wherein the plurality of first carbon nanotubes each does not contact an adjacent first carbon nanotube and is embedded in the first optical alignment base material.

2. The display panel of claim 1, wherein the second film layer comprises: a second optical alignment base material, and a second carbon nanotube layer merged into the second optical alignment base material,
   wherein the second carbon nanotube layer-comprises a plurality of second carbon nanotubes extending along a second direction, and wherein the orientation of the second optical alignment base material is parallel to the second direction.

3. The display panel of claim 2, wherein the first direction is perpendicular to with the second direction.

4. The display panel of claim 3, wherein the second film layer further includes a plurality of third touch electrodes and a plurality of fourth touch electrodes, both electrically connected to the second carbon nanotube layer,
   wherein the plurality of third touch electrodes are arranged parallel on a first surface of the second carbon nanotube layer, wherein the plurality of fourth touch electrodes are arranged parallel on a second surface of the second carbon nanotube layer, and wherein the plurality of third and the plurality of fourth touch electrodes are parallel.

5. The display panel of claim 4, wherein the plurality of first carbon nanotubes each in the first carbon nanotube layer is connected end to end to an adjacent first carbon nanotube in the first direction by Van der Waals force; and
   wherein the plurality of second carbon nanotubes each in the second carbon nanotube layer is connected end to end to an adjacent second carbon nanotube in the second direction by Van der Waals force.

6. The display panel of claim 4, wherein each of the plurality of second carbon nanotubes of the second carbon nanotube layer does not contact an adjacent second carbon nanotube and is embedded in the second optical alignment base material.

7. The display panel of claim 6, wherein the first optical alignment base material and the second optical alignment base material cover the surfaces of the respective carbon nanotube layers adjacent to the liquid crystal layer.

8. The display panel of claim 7, wherein the surface of the first optical alignment base material adjacent to the liquid crystal layer has a plurality of first grooves, wherein the plurality of first grooves extend along the first direction; and
   wherein the surface of the second optical alignment base material adjacent to the liquid crystal layer comprises a plurality of second grooves, wherein the plurality of second grooves extend along the second direction.

9. The display panel of claim 4, wherein at least one of the first optical alignment base material and the second optical alignment base material is doped with a dichroic dye, wherein the polarization direction of the dichroic dye is the same as the orientation of the alignment base material doped with the dichroic dye.

10. The display panel of claim 9, wherein the dichroic ratio of the dichroic dye is not smaller than 7.

11. The display panel of claim 10, wherein the dichroic dye comprises one or more of an azo dye, an anthraquinone dye, a biphenyl dye, a triphenyl dioxazine and derivative dye, a monomethine dye, a polymethine dye and a polycyclic dye.

12. The display panel of claim 4, wherein the first optical alignment base material and the second alignment base material each comprises one or more of cellulose triacetates, polyimides and polyamide acid.

13. The display panel of claim 1, wherein a plurality of first touch electrodes electrically connects to the first carbon nanotube layer, wherein the plurality of first touch electrodes are arranged parallel on a first surface of the first carbon nanotube layer; and
   wherein a plurality of second touch electrodes electrically connects to the first carbon nanotube layer, wherein the plurality of second touch electrodes is arranged parallel on a second surface of the first carbon nanotube layer, and wherein the plurality of first touch electrodes and the plurality of second touch electrodes are parallel to each other.

* * * * *